(12) United States Patent
Faynberg et al.

(10) Patent No.: US 12,074,914 B2
(45) Date of Patent: *Aug. 27, 2024

(54) SYSTEMS AND METHODS FOR INTERNET OF THINGS SECURITY ENVIRONMENT

(71) Applicant: CABLE TELEVISION LABORATORIES, INC, Louisville, CO (US)

(72) Inventors: Igor Faynberg, East Brunswick, NJ (US); Darshak Thakore, Broomfield, CO (US); Donald E. A. Clarke, Louisville, CO (US); Steven J. Goeringer, Westminster, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/049,946

(22) Filed: Oct. 26, 2022

(65) Prior Publication Data

US 2023/0080894 A1   Mar. 16, 2023

Related U.S. Application Data

(63) Continuation of application No. 16/176,865, filed on Oct. 31, 2018, now Pat. No. 11,516,252.

(Continued)

(51) Int. Cl.
*H04L 9/40* (2022.01)
*G06F 21/57* (2013.01)
(Continued)

(52) U.S. Cl.
CPC ............ *H04L 63/20* (2013.01); *G06F 21/572* (2013.01); *H04L 12/2838* (2013.01);
(Continued)

(58) Field of Classification Search
CPC . H04L 63/20; H04L 12/2838; H04L 63/0281; G06F 21/572; H04W 4/70; H04W 12/08
See application file for complete search history.

(56) References Cited

U.S. PATENT DOCUMENTS 9,838,384 B1 * 12/2017 Kane-Parry ........... G06F 21/316
2016/0378427 A1 * 12/2016 Sharma ............... G10L 19/0212
700/94

(Continued)

*Primary Examiner* — Cheng-Feng Huang
(74) *Attorney, Agent, or Firm* — Armstrong Teasdale LLP

(57) ABSTRACT

A system for monitoring the security of a connected Internet of Things (IoT) device is provided. The system includes a network doppelganger (ND) computer device. The ND computer device is in communication with the IoT device and a service provider computer device associated with the IoT device. The ND computer device is programmed to store a plurality of policies associated with the service provider computer device. The ND computer device is also programmed to receive a communication from the IoT device addressed to the service provider computer device. The ND computer device is further programmed to analyze the communication in view of the plurality of policies to determine whether the communication is approved. If the communication is approved, the ND computer device is programmed to route the communication to the service provider computer device.

22 Claims, 3 Drawing Sheets

Related U.S. Application Data

(60) Provisional application No. 62/579,592, filed on Oct. 31, 2017.

(51) Int. Cl.
 *H04L 12/28* (2006.01)
 *H04W 4/70* (2018.01)
 *H04W 12/08* (2021.01)

(52) U.S. Cl.
 CPC .......... *H04L 63/0281* (2013.01); *H04W 4/70* (2018.02); *H04W 12/08* (2013.01)

(56) References Cited

U.S. PATENT DOCUMENTS

| | | | |
|---|---|---|---|
| 2017/0086241 A1* | 3/2017 | Lopes | H04L 41/0846 |
| 2019/0089747 A1* | 3/2019 | Wang | H04L 63/1441 |
| 2020/0186998 A1* | 6/2020 | Smith | H04W 12/0471 |

* cited by examiner

SYSTEMS AND METHODS FOR INTERNET OF THINGS SECURITY ENVIRONMENT

CROSS REFERENCE TO RELATED APPLICATIONS

This application is a continuation of U.S. patent application Ser. No. 16/176,865, filed Oct. 31, 2018, which application claims the benefit of and priority to U.S. Provisional Patent Application No. 62/579,592, filed Oct. 31, 2017, entitled "METHOD AND APPARATUS FOR ENSURING SECURITY OF THE PRINCIPALS IN THE INTERNET OF THINGS (IOT) ENVIRONMENT," the benefits and disclosures of both prior applications are incorporated by reference herein.

BACKGROUND

The field of the disclosure relates generally to the security of Internet of Things (IoT) devices, and more particularly, to systems and methods for protecting data and communications provided to and by IoT devices.

The emerging IoT environment includes end-user devices (i.e., the "things" in the IoT) ranging from sensors to home utilities to medical devices. This environment not only inherits all the known and troublesome security problems present in the Internet, but also augments these problems in additional manners. One such problem is that the human users of these devices are not consistent in enforcing the security of their devices. This problem is expanding as the task of ensuring the security of a single telephone or personal computer is constantly growing, let alone ensuring the security of all of an individual's IoT devices. The absence of a single root-of-trust Public Key Infrastructure (PKI) renders the task of ensuring the security of a typical mobile phone extraordinarily difficult, given the proliferation of a multitude of obscure root-key certificates.

In addition, other factors that make the maintenance of the security of IoT devices very hard, if not outright impossible, for most human users is the necessity to maintain (securely) and remember various passwords, including the password for accessing the device, properly administering software updates, and otherwise having specialized device security knowledge that requires years of specialized development and training. Furthermore, in some cases, the individual IoT devices may have malicious code pre-installed on the device.

The consequences of a security failure to the end users can easily be a matter of life or death (as in cases of implanted medical devices or vehicles), not to mention loss of privacy or financial losses because of identity theft. The owners of the things/devices are not the only ones who will suffer such consequences. When the access to a device is stolen, just as it happens today with personal computers, the device itself becomes a vector for spreading viruses and conducting denial of service attacks that potentially can have catastrophic effect on other principals, including, but not limited to the service providers who offer the IoT services and the network operators who host such service providers.

SUMMARY

In an embodiment, a system for monitoring the security of a connected Internet of Things (IoT) device includes a network doppelganger (ND) computer device. The ND computer device includes at least one processor in communication with at least one memory device. The ND computer device is in communication with the IoT device and a service provider computer device associated with the IoT device. The at least one memory device stores a plurality of instructions, which when executed by the at least one processor cause the at least one processor to store a plurality of policies associated with the service provider computer device, receive a communication from the IoT device addressed to the service provider computer device, analyze the communication in view of the plurality of policies to determine whether the communication is approved, and if the communication is approved, route the communication to the service provider computer device.

BRIEF DESCRIPTION OF THE DRAWINGS

These and other features, aspects, and advantages of the present disclosure will become better understood when the following detailed description is read with reference to the following accompanying drawings, in which like characters represent like parts throughout the drawings.

Figure 1:
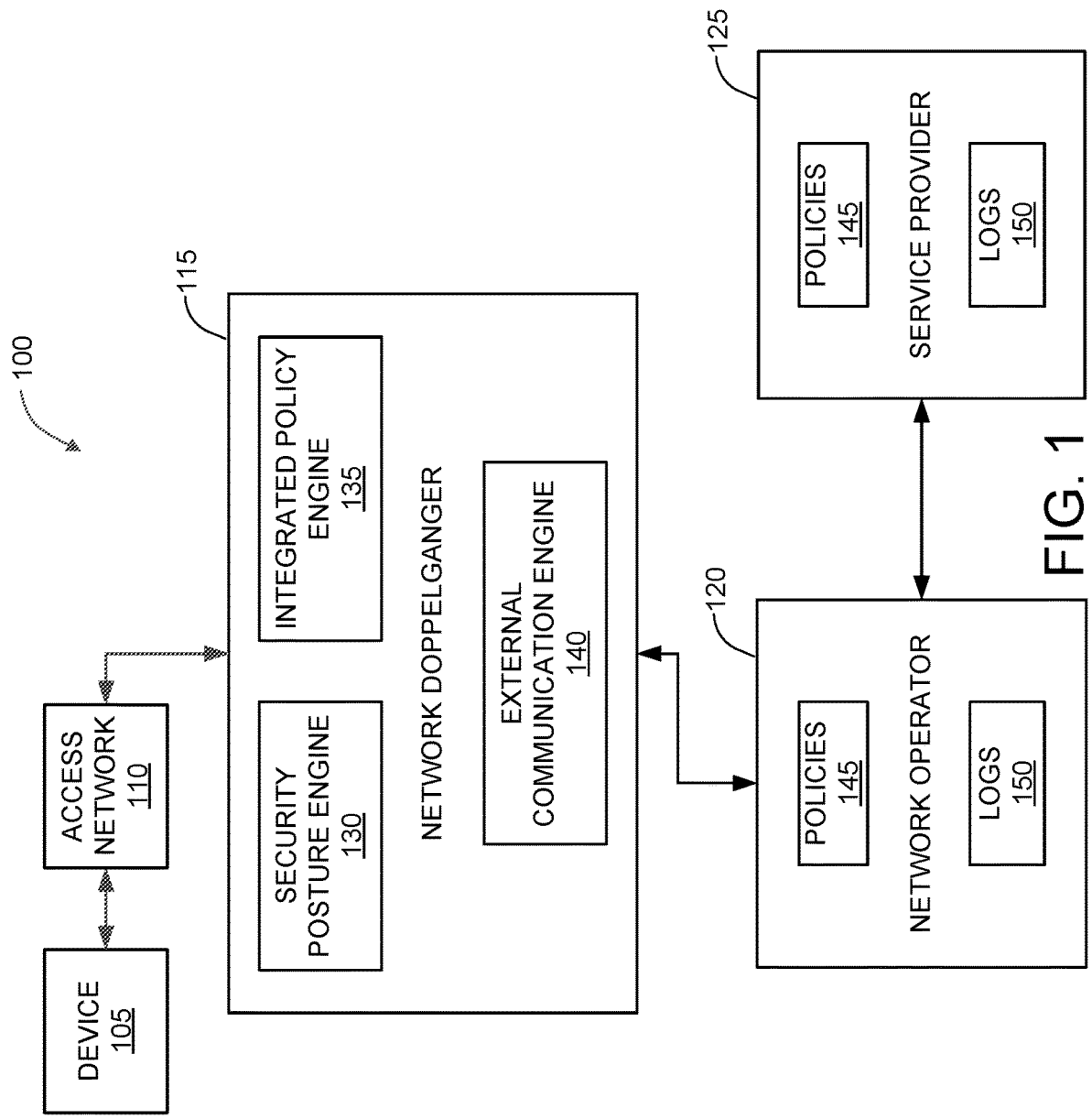
FIG. 1 is a schematic illustration of an IoT device network security system that utilizes a network doppelganger to securely monitor and maintain the security status of the IoT device, according to an embodiment.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

The embodiments described herein provide systems and methods for monitoring and maintaining the security status of a connected IoT device. In an exemplary embodiment, a network doppelganger interfaces between a device, such as an IoT device and a service provider that is in communication with the device. The network doppelganger acts as a protective interface, or "midbox", that monitors communications between the device and the service provider. In some embodiments, the network doppelganger monitors for malicious activities on the part of the device and protects other devices on the network and the service provider from such activities.

In some further embodiments, the network doppelganger acts to protect the device by ensure that proper security procedures are followed. These security procedures may be defined by one or more of the service provider, the network that the service provider is running on, and/or the network that the device is connected to. These security procedures could include, ensuring the device follows proper password security, ensuring the device is up to date with software patches, and monitoring and potentially communications from and to the device for potential security issues and/or events. Furthermore, in some embodiments, the network doppelganger is connected to and monitors multiple devices simultaneously.

In some embodiments, the network doppelganger acts as an effective point of top insertion for law enforcement activities to lawfully intercept communications, such as those under the Communications Assistance for Law Enforcement Act (CALEA).

In some embodiments, the device is mobile. In these embodiments, the access network function may be provided by a different network operator, such that every time that the device changes network, the network doppelganger acts to protect that network and integrate the policies of the connected to network.

FIG. 1 is a schematic illustration of a network security system 100 that utilizes a network doppelganger 115 to securely monitor and maintain the security status of a device 105, according to an embodiment.

The device 105, may include, but is not limited to an IoT device, a client computing device (e.g., a smartphone, tablet, laptop, desktop computing device, wearable, or other computing device), or another type of device that allows the system to work as described herein. In some embodiments, the device 105 may be a medical device that is either remotely monitored and/or controlled.

In an exemplary embodiment, the device 105 connects to a network operator 120, such as through an access network 110. The access network 110 may be, but is not limited to, a home or enterprise network. In some embodiments, the device 105 is mobile. In these embodiments, the access network function may be provided by a different network operator. Through the network operator 120, the device 105 is connected to one or more service providers 125. Service providers 125 are services that provide functionality to the device 105. In some further embodiments, the service provider 125 is a network provider or is hosted by the network provider. In the exemplary embodiment, both the network operator 120 and the service provider 125 include policies 145 and store logs 150.

In some embodiments, the service providers 125 act as data collection and storage for the device 105, which may be a sensor. In other embodiments, the service providers 125 receive data from the device 105 and provide instructions to the device 105. In some embodiments, the device 105 is a medical device and the service provider 125 is associated with a medical office. For all practical purposes, access to the service providers 125 is represented by a data communication interface, such as, but not limited to, a Remote Procedure Call (RPC) or a Hyper-Text Transfer Protocol-based application programmer's interface (API).

In the exemplary embodiment, data and communication between the device 105 and the service provider 125 is routed through the network doppelganger 115. The network doppelganger 115 acts as a midbox. In the exemplary embodiment, the network doppelganger 115 is configured to constantly evaluate the security properties of the device 105. The network doppelganger 115 is also configured to proactively take measures to enforce the security of the device 105. The network doppelganger 115 is further configured to protect the network operator 120 and the service provider 125 from malicious activity directed from the device 105.

In the exemplary embodiment, the network doppelganger 115 includes a security posture engine 130, an integrated policy engine 135, and an external communication engine 140. In the embodiment depicted in FIG. 1, the network doppelganger 115 is illustrated as a midbox between the access network 110, the network operator 120, and the service provider 125. In practical implementation, the network doppelganger 115 may be an integrated hardware or software component of the access network 110, the network operator 120, or the service provider 125, or may be a separate entity in communication with these other system elements. In some embodiments, the network doppelganger 115 is virtualized, and may optionally distribute individual functions among one or more of the several system components. In at least one embodiment, the service provider 125 is the network operator 120 itself, or simply hosted by the network provider 120.

In the exemplary embodiment, the security posture engine 130 is configured to poll the device 105 to determine the validity and strength of any password associated with the device 105. The security posture engine 130 is also configured to force the end user of the device 105 to change the password to a more secure password when essential. For example, the security posture engine 130 may transmit messages instructing the end user to change the password of the device 105. These instructions may also include guidelines for a strong password. In some embodiments, the security posture engine 130 transmits the instructions directly to the device 105 to be displayed by the device 105 to the end user. In other embodiments, the security posture engine 130 transmits the instructions to the service provider 125. The service provider 125 then contacts the end user and instructs the end user to change the device's password.

In the exemplary embodiment, the security posture engine 130 is also configured to check the integrity of the hardware and the software of the device 105. In some embodiments, the integrity check is performed by an integrity verification, such as attestation. In some of these embodiments, the security posture engine 130 transmits an integrity check which includes a nonce to the device 105. The device 105 generates a signature using the nonce and information about the device itself. The device 105 responds to the integrity check with the generated signature. The security posture engine 130 then analyzes the generated signature to determine a trust level for the device 105.

In the exemplary embodiment, the security posture engine 130 analyzes the software and hardware of the device 105 and determines if software patches or other updates are required to the device 105. If a patch or update is required, then the security posture engine 130 instructs the device 105 to install the patch or update. In some embodiments, the security posture engine 130 transmits the patch and/or update to the device 105 for the device 105 to install. In other embodiments, the security posture engine 130 takes control of the device 105 and installs the patch or update remotely.

In the exemplary embodiment, the security posture engine 130 also logs essential security events. The security posture engine 130 transmits the logs 150 to either the network operator 120 or the service provider 125 as necessary. In the exemplary embodiment, the security events are based on the policies 145 of the network operator 120 and/or the service provider 125. The policies 145 are received from the network operator 120 and/or the service provider 125 by the integrated policy engine 135, which then communicates the policies 145 to the security posture engine 130 to know which events to log. Within this description, the term "security event" is used somewhat broadly, and may be defined by the policies 145. For example, in the case of a medical device, having the device be turned off or appear to be inoperable may be an event that needs to be logged. In some cases, the events may also cause alarms to be triggered. In these cases, the network doppelganger 115 transmits an alarm to at least one of the network operator 120, the service provider 125, and the device 105.

In the exemplary embodiment, the external communication engine 140 monitors the communications between the device 105 and the rest of the Internet. In some embodiments, the external communication engine 140 modifies these communications to adhere to the network operator 120 and service provider 125 policies 145.

In some embodiments, the external communication engine 140 and the security posture engine 130 use pattern recognition and other machine-learning technologies to detect anomalies. Examples of anomalies include, but are not limited to the presence of viruses, communication patterns that might constitute denial of service attacks, and communications that may be related to Trojans or other remote access of the device 105. The external communication engine 140 and the security posture engine 130 may be connected to respective security monitoring modules.

In some embodiments, the network doppelganger 115 is implemented on standalone hardware as a set of independent processes. In these embodiments, one or more processes may be associated with each of the entities, (i.e., security posture engine 130, the integrated policy engine 135, and the external communication engine 140). In some embodiments, each of the processes is under the control of an operating system. Furthermore, the network doppelganger 115 may be connected to several, separate devices 105 and may be configured to monitor and update each of the connected devices 105. This allows the network doppelganger 115 to be virtualized so that the individual entities can be executed as a container or so that the individual entities can be virtualized as a network appliance. This virtualization feature allows for supporting the mobility of the network doppelganger 115 so that the network doppelganger 115 may support mobile devices 105. In at least one embodiment, a single instance of network doppelganger 115 may be configured to act on behalf of several identical "things," e.g., devices 115.

In some embodiments, a Network Function Virtualization (NFV) environment supports the movement of the above described virtual functions within a network operator's cloud. The NFV environment allows the network doppelganger 115 to support the service agreement (and policies 145) of another network operator's cloud. This allows for the roaming of the device 105, so that the network doppelganger 115 shadows the device 105 to reduce latency and optimize performance of the device 105.

Figure 2:
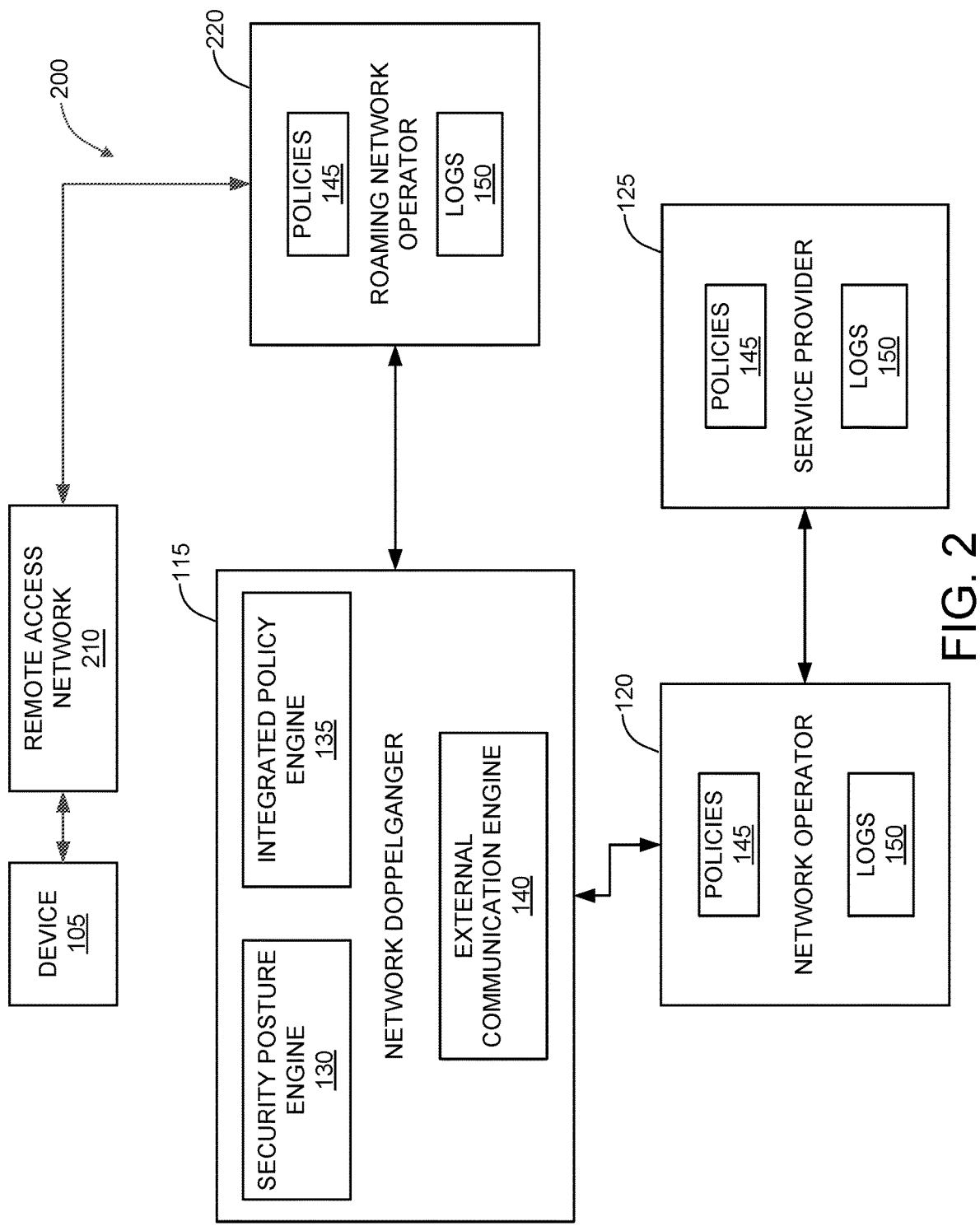
FIG. 2 is a schematic illustration of a roaming network security system that utilizes the network doppelganger shown in FIG. 1 to securely monitor and maintain the security status of a roaming device, according to an embodiment.

FIG. 2 is a schematic illustration of a roaming network security system 200 that utilizes the network doppelganger 115 shown in FIG. 1 to securely monitor and maintain the security status of a roaming device 105, according to an embodiment.

In the roaming system 200, the device 105 attempts to access the network operator 120 and the service provider 125 via a remote access network 210. The remote access network 210 may be any network that allows the device 105 to access the Internet. For example, the remote access network 210 may be, but is not limited to, a cellular network, a network provided by a public location, a place of business, and a vehicle, and a network at another residence. The remote access network 210 is generally associated with a roaming network operator 220, which may be a network provider. The roaming network operator 220 then connects the device with the network doppelganger 115 associated with the device 105. In some embodiments, the roaming network operator 220 contacts the network operator 120, which then instructs the roaming network operator 220 where to locate the network doppelganger 115. In some further embodiments, the roaming network operator 220 includes policies 145 that are communicated to the integrated policy engine 135 of the network doppelganger 115. The security posture engine 130 then uses the policies 145 of the roaming network operator 220 in the operation of the network doppelganger 115. When the device 105 disconnects from the first remote access network 210 and connects to a second remote access network 210, the network doppelganger 115 may receive different policies 145 associated with a different roaming network operator 220.

Figure 3:
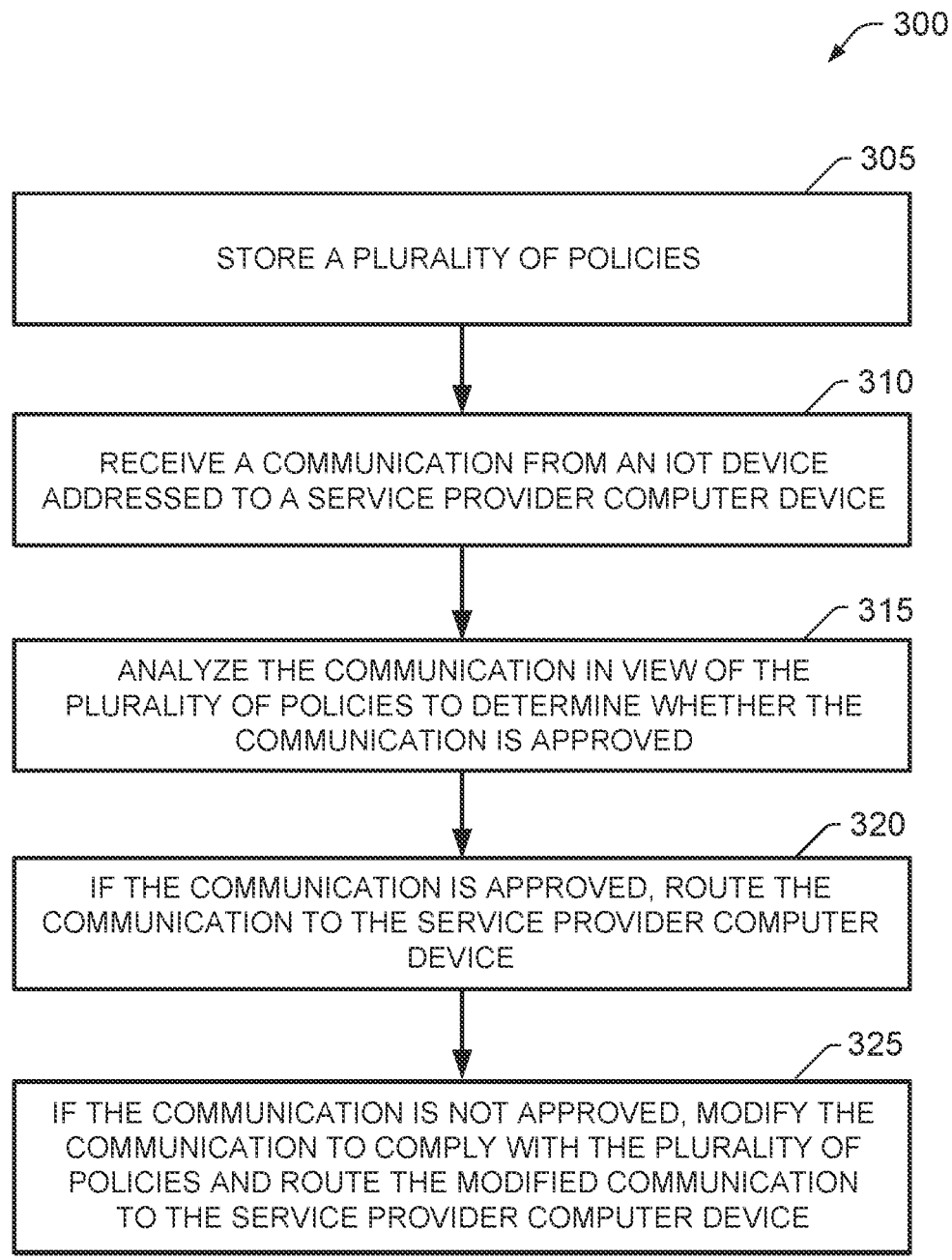
FIG. 3 is a process for securely monitoring and maintaining a security status of a device using the network doppelganger shown in FIG. 1.

FIG. 3 is a process 300 for securely monitoring and maintaining a security status of a device 105 using the network doppelganger 115, both shown in FIG. 1. In the exemplary embodiment, the network doppelganger 115 is executed on a network doppelganger computer device. In other embodiments, the functionality of the network doppelganger 115 is distributed over a plurality of computer devices.

In the exemplary embodiments, the network doppelganger computer device includes at least one processor in communication with at least one memory device. The memory device stores instructions, such that, when executed by the at least one processor, the instructions cause the at least one processor to at least perform the steps of process 300 as described herein.

In the exemplary embodiment, the network doppelganger computer device stores 305 a plurality of policies, such as policies 145. These policies may be associated with the service provider 125 or the network operator 120, both shown in FIG. 1. These policies define actions and restrictions that the associated system applies to devices 105. In the exemplary embodiment, the policies 145 are maintained by the integrated policy engine 135, shown in FIG. 1.

In the exemplary embodiment, the network doppelganger computer device receives 310 a communication from the device 105 addressed to a computer device associated with the service provider 125, hereinafter called the service provider computer device. The communication may include a message, a data packet, streaming data, a request for instructions, and/or any other communication addressed to the service provider 125. In other embodiments, the communication may be directed to the network operator 120 or another device 105. The network doppelganger computer device receives the communication via the access network 110, shown in FIG. 1. The external communication engine 140, shown in FIG. 1, receives the communication.

The network doppelganger computer device analyzes 315 the communication in view of the plurality of policies to determine whether the communication is approved. In the exemplary embodiment, the security posture engine 130, shown in FIG. 1, analyzes 315 the communication to determine if the communication is approved.

If the communication is approved, the network doppelganger computer device routes 320 the communication to the service provider computer device. In some embodiments, the network doppelganger computer device routes 320 the communication to the service provider computer device via one or more computer devices associated with the network operator 120.

If the communication is not approved, the network doppelganger computer device modifies 325 the communication to comply with the plurality of policies and route the modified communication to the service provider computer device. For example the network doppelganger computer device may determine that the communication is too long and split the communication into multiple messages. In some embodiments, the network doppelganger computer device discards the communication if the communication is not approved.

In the exemplary embodiment, communication between the device 105 and the service provider 125 is bi-directional. The network doppelganger computer device receives a second communication from the service provider computer device addressed to the device 105. The network doppelganger computer device analyzes the second communication in view of the plurality of policies associated with the service provider 125 and the network operator 120. If the second communication is approved, the network doppelganger computer device routes the communication to the service provider computer device. If the second communication is not approved, the network doppelganger computer device modifies the communication to comply with the plurality of policies associated with the service provider 125 and the network operator 120 and routes the modified second communication to the device 105.

In some embodiments, the network doppelganger computer device receives password information from the device 105. The network doppelganger computer device analyzes the password information to determine a security level of the password information. The security level may be based on the policies of the network operator 120 and the service provider 125. If the security level of the password information is below a required security threshold, the network doppelganger computer device instructs a user associated with the device 105 to update the password information. In some embodiments, the network doppelganger computer device also transmits guidelines for password security to the user. In these embodiments, the guidelines for password security are based on the plurality of policies. In some further embodiments, the network doppelganger computer device transmits the instruction to the user to at least one of the device 105 and the service provider computer device.

In some embodiments, the network doppelganger computer device requests and receives security information from the device 105. This security information may include, but is not limited to, software and hardware version information. The network doppelganger computer device analyzes the security information based, at least in part, on the plurality of policies. The network doppelganger computer device may then determine that a software update is necessary for the device 105 based on the analysis of the security information. In some embodiments, the network doppelganger computer device transmits an instruction to the device 105 to install the software update. In further embodiments, the network doppelganger computer device transmits the software update to the device 105. In still further embodiments, the network doppelganger computer device remotely controls the device 105 to install the software update.

In some embodiments, the network doppelganger computer device is configured to communicate with a tap computer device. In these embodiments, the network doppelganger computer device transmits communications received from and transmitted to the device 105 to the tap computer device.

The computer-implemented methods discussed herein may include additional, less, or alternate actions, including those discussed elsewhere herein. The methods may be implemented via one or more local or remote processors, transceivers, and/or sensors (such as processors, transceivers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, a reinforced or reinforcement learning module or program, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample (e.g., training) data sets or certain data into the programs, such as communication data of compromised and uncompromised devices, communication data from a wide variety of devices, and communication data of a wide variety of malicious sources. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or other types of machine learning, such as deep learning, reinforced learning, or combined learning.

Supervised and unsupervised machine learning techniques may be used. In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. The unsupervised machine learning techniques may include clustering techniques, cluster analysis, anomaly detection techniques, multivariate data analysis, probability techniques, unsupervised quantum learning techniques, associate mining or associate rule mining techniques, and/or the use of neural networks. In some embodiments, semi-supervised learning techniques may be employed. In one embodiment, machine learning techniques may be used to extract data about the device, network, policies, communications, activities, software, hardware, malicious code, and/or other data.

In the exemplary embodiment, a processing element may be trained by providing it with a large sample of communication data with known characteristics or features. Such information may include, for example, information associated with a specific device, type of device, device activity, network activity, software versions, and/or other data.

Based upon these analyses, the processing element may learn how to identify characteristics and patterns that may then be applied to analyzing communication data. For example, the processing element may learn, with the user's permission or affirmative consent, to identify the necessary upgrades necessary for attached device, potential security vulnerabilities associated with different software, and communication data associated with those security vulnerabilities being compromised. This information may be used to determine how to modify communications to and from the device to prevent compromise of other devices and networks.

The exemplary embodiments provided herein describe a network doppelgänger, that is advantageously disposed within one or more of the operator network, the service provided, and the access network, to intercept the traffic emanating from the device/thing, and to communicate with other entities on behalf of the device/thing. The network doppelgänger thus functions as a midbox capable of: (i) repeatedly evaluating the security properties of the device/thing and pro-actively taking measures to enforce the security thereof; (ii) protecting the network operator and service provider, as well as other system/network endpoints; and/or (iii) providing a point of enforcement for lawful interception. A security posture engine of the network doppelganger may therefore be configured, based on respective service provider and network operator policies imported and integrated in an integrated policy engine, to: (i) poll the device/thing for the validity and strength of the device password, and force changes where needed; (ii) check the integrity of the hardware and software of the device/thing (e.g., by attestation); (iii) force security software patches and other updates; and/or (iv) log essential device security events and reports the log to the service provider and/or the network operator.

The aspects described herein may be implemented as part of one or more computer components such as a client device and/or one or more back-end components, such as a network doppelganger, for example. Furthermore, the aspects described herein may be implemented as part of a computer network architecture and/or a cognitive computing architecture that facilitates communications between various other devices and/or components. Thus, the aspects described herein address and solve issues of a technical nature that are necessarily rooted in computer technology.

For instance, aspects include analyzing various sources of communication data to determine potential compromise of a connected device, monitor and update the security of the connected device, and facilitate communication with a roaming device. In doing so, the aspects overcome issues associated with having compromised devices infect other devices and ensuring proper communications between a device and a service provider. Furthermore, these aspects reduce the chance of data compromise and allow for proposer access to the communications. Without the improvements suggested herein, additional processing and memory usage, or even direct human intervention, would be required to perform such activities. Additional technical advantages include, but are not limited to: i) improved speed and responsiveness in communication with a connected device; ii) ensuring devices comply with policies of attached networks; iii) ensuring that devices are up to date with security practices and software updates; iv) reducing malicious communications; v) automatically intercepting and modifying malicious messages; and vi) allow for constant monitoring of the state of connected devices. Additional technical advantages are described in other sections of the specification.

Furthermore, the embodiments described herein improve upon existing technologies, and improve the functionality of computers, by more accurately predict or identify the current security status of any connected device. The present embodiments improve the speed, efficiency, and accuracy in which such calculations and processor analysis may be performed. Due to these improvements, the aspects address computer-related issues regarding efficiency over conventional techniques. Thus, the aspects also address computer related issues that are related to computer security, for example.

Accordingly, the innovative systems and methods described herein are of particular value within the realm of IoT devices, which have been historically associated with a poor record of securing communications and data. The present embodiments enable more reliable updating and control of such devices, but without compromising data and communications. Furthermore, according to the disclosed techniques, service providers and network operators are better able to monitor and update the security of connected IoT devices, and thereby protect other IoT devices on the network. Moreover, the ability to more reliably track devices, but without adding additional risk to consumer data, greatly enhances the ability of manufacturers to realize secondary market revenue for a device, such as in the case of software updates to the device programming, or new commercial opportunities that may be exploited in association with the device (e.g., marketing promotions, cross-sales, seasonal activities).

Exemplary embodiments of systems and methods for securing IoT devices are described above in detail. The systems and methods of this disclosure though, are not limited to only the specific embodiments described herein, but rather, the components and/or steps of their implementation may be utilized independently and separately from other components and/or steps described herein.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for monitoring the security of at least one Internet of Things (IoT) device attempting to connect with an associated service provider computer device separate and distinct from the at least one IoT device, comprising:
   a network doppelgänger (ND) computer device comprising at least one processor in communication with at least one memory device,
   wherein the ND computer device is (i) in communication with the at least one IoT device and the service provider computer device, (ii) separate and distinct from the at least one IoT device and the service provider computer device, and (iii) configured to provide an intervening physical midbox between the at least one IoT device and the service provider computer device preventing direct communication between the at least one IoT device and the service provider computer device, and
   wherein the at least one memory device stores a plurality of instructions, which when executed by the at least one processor cause the at least one processor to:
   store a plurality of policies associated with the service provider computer device;
   intercept a first communication to the at least one IoT device;
   analyze the first communication in view of the plurality of policies to determine whether the first communication is approved;
   based on the analysis of the first communication, approve the first communication and route the first communication to the at least one IoT device;
   intercept a second communication to the at least one IoT device;
   analyze the second communication in view of the plurality of policies;
   based on the analysis of the second communication, modify the second communication to comply with the plurality of policies;
   route the modified second communication to the at least one IoT device;
   monitor individual additional communications to the at least one IoT device for malicious activity determined by analyzing the individual additional communications in view of the plurality of policies; and
   disapprove particular ones of the individual additional communications for routing to the at least one IoT device upon determination of malicious activity.

2. The system in accordance with claim 1, wherein the instructions further cause the at least one processor to:
   intercept a third communication to the at least one IoT device;
   analyze the third communication in view of the plurality of policies; and
   based on the analysis of the third communication, disapprove the third communication for routing to the at least one IoT device.

3. The system in accordance with claim 2, wherein the instructions further cause the at least one processor to discard the second communication.

4. The system in accordance with claim 1, wherein the ND computer device is further in operable communication with a network operator computer device and wherein the network operator computer device is configured to route the first communication between the at least one IoT device and the ND computer device.

5. The system in accordance with claim 4, wherein the instructions further cause the at least on processor to:
store a second plurality of policies associated with the network operator computer device; and
analyze the first communication in view of both the plurality of policies associated with the service provider computer device and the network operator computer device.

6. The system in accordance with claim 1, wherein the instructions further cause the at least one processor to:
receive password information from the at least one IoT device;
analyze the password information to determine a security level of the password information; and
if the security level of the password information is below a required security threshold, transmit update information to a user associated with the at least one IoT device.

7. The system in accordance with claim 6, wherein the transmitted update information includes guidelines for password security to the user.

8. The system in accordance with claim 7, wherein the guidelines for password security are based on the plurality of policies.

9. The system in accordance with claim 6, wherein the instructions further cause the at least one processor to transmit the update information to at least one of the at least one IoT device and the service provider computer device.

10. The system in accordance with claim 6, wherein the transmitted update information includes one or more of a message, a data packet, streaming data, and a request for instructions.

11. The system in accordance with claim 6, wherein the transmitted update information is configured to cause the at least one IoT device to install a software update.

12. The system in accordance with claim 6, wherein the transmitted update information includes at least one of a patch and a software update for the at least one IoT device.

13. The system in accordance with claim 1, wherein the instructions further cause the at least one processor to:
request and receive security information from the at least one IoT device; and
analyze the security information based, at least in part, on the plurality of policies.

14. The system in accordance with claim 13, wherein the security information includes software and hardware information, and wherein the instructions further cause the at least one processor to determine that a software update is necessary for the at least one IoT device.

15. The system in accordance with claim 14, wherein the instructions further cause the at least one processor to transmit an instruction to the at least one IoT device to install the software update.

16. The system in accordance with claim 15, wherein the instructions further cause the at least one processor to transmit the software update to the at least one IoT device.

17. The system in accordance with claim 14, wherein the instructions further cause the at least one processor to control the at least one IoT device to install the software update.

18. The system in accordance with claim 1, wherein the ND computer device is further in operable communication with a tap computer device, and wherein the ND computer device is further configured to transmit to the tap computer device one or more communications (i) received from and (ii) transmitted to the at least one IoT device.

19. The system in accordance with claim 1, wherein the at least one IoT device includes a first IoT device and a second IoT device separate and different from the first IoT device, and wherein the ND computer device is further configured to (i) simultaneously monitor the first and second IoT devices, and (ii) determine a different security level for the first IoT device than for the second IoT device.

20. The system in accordance with claim 1, wherein the instructions further cause the at least one processor to determine the malicious activity in a particular communication of the individual additional communications by detecting at least one of (i) malicious code in, and (ii) malicious source of, data extracted from the particular communication by the ND computer device.

21. The system in accordance with claim 1, wherein the ND computer device is virtualized.

22. The system in accordance with claim 1, wherein the ND computer device comprises a virtual network function (VNF).

* * * * *